M. J. MOLITOR.
BOW REST FOR AUTOMOBILE TOPS.
APPLICATION FILED MAY 17, 1912.

1,055,285.

Patented Mar. 4, 1913.

Witnesses:—

Inventor,
M. J. Molitor.
By
Attorney

UNITED STATES PATENT OFFICE.

MARTIN J. MOLITOR, OF ZIONS, MINNESOTA, ASSIGNOR OF ONE-HALF TO MATHIAS BRITZ, OF ZIONS, MINNESOTA.

BOW-REST FOR AUTOMOBILE-TOPS.

1,055,285.

Specification of Letters Patent. Patented Mar. 4, 1913.

Application filed May 17, 1912. Serial No. 698,039.

*To all whom it may concern:*

Be it known that I, MARTIN J. MOLITOR, a citizen of the United States, residing at Zions, in the county of Stearns, State of Minnesota, have invented certain new and useful Improvements in Bow-Rests for Automobile-Tops; and I do hereby declare the following to be a full, clear, and exact description of the invention, such as will enable others skilled in the art to which it appertains to make and use the same.

This invention relates to improvements in bow rests for automobile tops, and has for its object to so construct a device of this character that the bows of the top will be automatically engaged thereby and held firmly against accidental displacement.

A further object of the invention is to produce a device of this character, which will be simple in construction, efficient in operation and one which may be easily applied to the body of an automobile.

Figure 1:
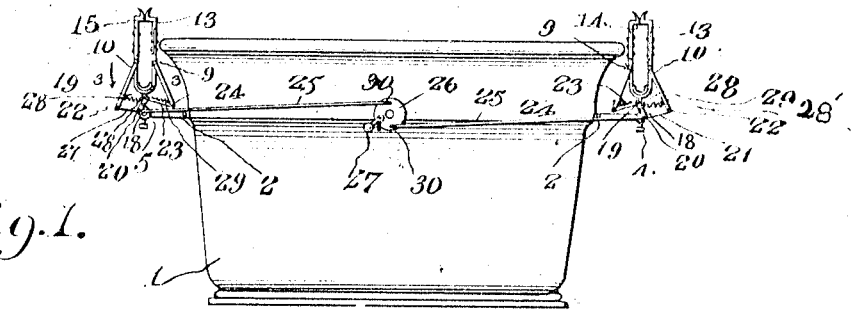
Figure 2:
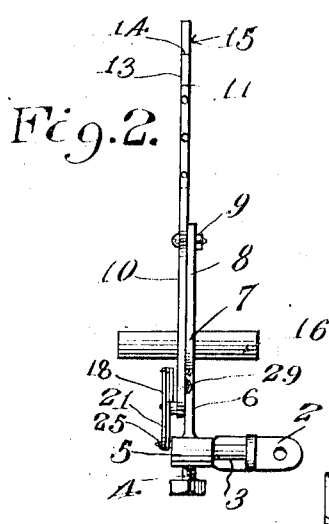
Figure 3:
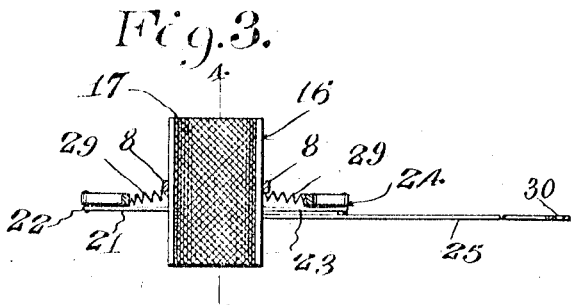
Figure 4:
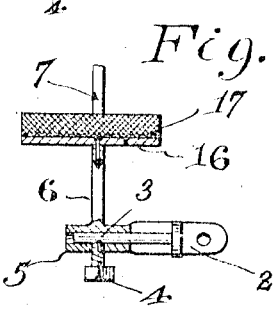
Figure 5:
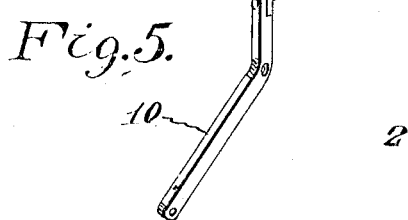
Figure 6:
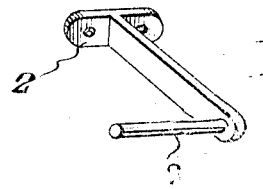

With these and other objects in view, this invention resides in the novel features of construction, formations, combinations and arrangements of parts to be hereinafter more fully described, claimed and illustrated in the accompanying drawing, in which:

Figure 1 is a rear elevation of an automobile body showing the device in place thereon. Fig. 2 is a side elevation of one of the rests. Fig. 3 is a sectional view on line 3—3 of Fig. 1. Fig. 4 is a similar view on line 4—4 of Fig. 3. Fig. 5 is a detail perspective view of one of the arms. Fig. 6 is a similar view of one of the attaching lugs.

Referring to the drawing, the numeral 1 designates the rear portion of an automobile body having secured thereto by flanges 2 lugs 3, said lugs being arranged near the side edges of the body.

Held in engagement upon the lugs 3 by set screw 4 are collars 5, said collars having formed integral therewith necks 6. The necks 6 terminate in yokes 7. The upper ends of the arms 8 of the yokes 7 are provided with perforated ears 9, which are adapted to pivotally support the arms 10, said arms having their lower ends directed outwardly. The upper ends of the arms 8 are rabbeted, as at 11 which are adapted to coact with correspondingly shaped lower ends 12 formed upon the lower ends of the fingers 13, said fingers being provided with inwardly directed portions 14, which terminate in beveled jaws 15. The fingers 13 are formed from finished steel, while the arms 8 are produced from cast iron.

Secured in the base of each yoke 7 is a concavo-convex plate 16, the upper surface of which is provided with a felt facing 17, to prevent marring of the lowermost bow of the folded top.

Pivotally mounted intermediate their ends upon the necks 6 are levers 18, said levers having their upper and lower ends provided with perforations 19 and 20, respectively. Links 21 are provided, and have their inner ends pivotally connected in the perforations 20 of the levers 18, and their outer ends pivotally connected in the perforations 22 formed in the lower ends of the arms 10. Similar links 23 are provided and have their inner ends pivotally connected in the perforations 19 of the levers 18, and their outer ends similarly connected in the perforations 24 formed in the lower ends of the arms 10.

Pivotally connected at their outer ends to the perforations 20 of the levers 18 are the outer ends of pitman rods 25, the inner ends of which are eccentrically connected to a disk 26 which is rotatably mounted intermediate the collars 5, and to the body 1 of the automobile. The disk 26 is provided with a handle 27, which when grasped and operated, the said disk will be partially rotated, thus drawing upon the pitmen 25 whereupon the levers 18 will be rocked, thus drawing the arms 8 away from each other so that the automobile top may be removed from the rest.

The lower ends of the arms are each provided with lugs 28, similar lugs 28' being also provided upon the opposite sides of the necks 6. Coil springs 29 are provided and have their outer terminals encircling the lugs 28 formed upon the arms, and the inner terminals encircling the lugs 28' upon the necks 6, thus preventing accidental displacement of the said springs. Said springs serve to normally hold the upper ends of the arms 8 in contacting relation and at the same time permitting the bows of an automobile top to pass therebetween when the top is lowered. The inner ends of the pitmen 25 are formed with longitudinal slots 30, which permit sufficient play at their pivotal point with the levers 18 to permit a slight spreading movement of said arms when the bows are passing therebetween. By forming the upper and lower ends of the arms 8 and 12 with rabbets the same may be adjusted vertically so as to accommodate bows of different sizes.

What is claimed is:—

1. The combination with a vehicle body having lugs carried thereby, of collars engaging said lugs, yokes carried by the collars, arms pivotally connected to the ends of the yokes, means for normally holding the upper ends of the arms in contacting relation, a disk mounted on the body, and means connecting the disk and arms to simultaneously spread the said arms apart upon operation of the disks.

2. The combination with a vehicle body having lugs carried thereby, a disk carried by said body and between the lugs, collars engaging said lugs, necks formed upon the collars, yokes carried by the necks, arms pivotally connected to the upper ends of the arms of the yokes, a lever pivotally mounted on the necks, links connecting the lower ends of said arms and the opposite ends of the levers, pitmen having their outer ends pivotally connected to the lower ends of the levers and their inner ends similarly connected to the disk, means for holding the arms closed, said disk being operable to spread the arms apart, as and for the purposes set forth.

In testimony whereof, I affix my signature, in presence of two witnesses.

MARTIN J. MOLITOR.

Witnesses:
 MATT BRITZ,
 PETER RAEDER.